(12) United States Patent
Vos

(10) Patent No.: US 9,716,988 B2
(45) Date of Patent: Jul. 25, 2017

(54) METHOD AND APPARATUS FOR COMMUNICATING WITH LTE TERMINALS HAVING RESTRICTED CAPABILITIES

(71) Applicant: Sierra Wireless, Inc., Richmond (CA)

(72) Inventor: Gustav Gerald Vos, Surrey (CA)

(73) Assignee: Sierra Wireless, Inc., Richmond (CA)

( * ) Notice: Subject to any disclaimer, the term of this patent is extended or adjusted under 35 U.S.C. 154(b) by 1 day.

(21) Appl. No.: 14/497,145

(22) Filed: Sep. 25, 2014

(65) Prior Publication Data

US 2015/0085689 A1 Mar. 26, 2015

Related U.S. Application Data

(60) Provisional application No. 61/883,116, filed on Sep. 26, 2013.

(51) Int. Cl.
*H04W 74/00* (2009.01)
*H04W 4/18* (2009.01)
(Continued)

(52) U.S. Cl.
CPC .......... *H04W 4/18* (2013.01); *H04W 4/005* (2013.01); *H04W 74/0833* (2013.01); *H04W 74/006* (2013.01)

(58) Field of Classification Search
CPC ... H04W 4/005; H04W 4/18; H04W 74/0833; H04W 74/006; H04W 4/006;
(Continued)

(56) References Cited

U.S. PATENT DOCUMENTS 8,295,243 B2  10/2012  Malladi et al.
2009/0135769 A1  5/2009  Sambhwani et al.
(Continued)

FOREIGN PATENT DOCUMENTS

EP       2 680 656 A1    1/2014
WO   WO 2013/020494 A1   2/2013
(Continued)

OTHER PUBLICATIONS http://4g-lte-world.blogspot.ca/2013/04/random-access-procedure-rach-in-lte.html.
(Continued)

*Primary Examiner* — Charles C Jiang
*Assistant Examiner* — Rose Clark
(74) *Attorney, Agent, or Firm* — DLA Piper LLP (US)

(57) ABSTRACT

A method and system for facilitating communication in an LTE network between an eNB and Limited Capability Terminal Equipments (LCTEs). A subset of PRACH preambles is defined for use by the LCTEs. PRACH preambles are selected by LCTEs only from said subset for inclusion in transmission of a PRACH preamble message to the eNB. Upon receipt of a PRACH preamble belonging to the subset, the eNB adjusts its operation to accommodate a limitation of the LCTE corresponding to the PRACH preamble. For example, the eNB may schedule transmission of the associated RAR on a restricted set of PRBs which is predictable and accessible to said LCTEs, to accommodate LCTE reception limitations. The subset of PRACH preambles can be adjusted in size in order to control system performance. The subset may include one or more preambles for exclusive use by LCTEs and/or preambles for non-exclusive use by LCTEs.

24 Claims, 5 Drawing Sheets

(51) Int. Cl.
*H04W 74/08* (2009.01)
*H04W 4/00* (2009.01)

(58) Field of Classification Search
CPC .......... H04W 74/008; H04W 74/0891; H04W 74/00; H04W 74/002
See application file for complete search history.

(56) References Cited

U.S. PATENT DOCUMENTS

| | | | |
|---|---|---|---|
| 2010/0040001 A1 | 2/2010 | Montojo et al. | |
| 2011/0274040 A1* | 11/2011 | Pani | H04W 4/005 370/328 |
| 2012/0307774 A1* | 12/2012 | Zhao | H04W 74/08 370/329 |
| 2013/0021997 A1* | 1/2013 | Lee | H04W 74/0841 370/329 |
| 2013/0301552 A1* | 11/2013 | Xu | H04W 4/005 370/329 |
| 2014/0004857 A1* | 1/2014 | Rune | H04W 48/12 455/434 |
| 2014/0056244 A1* | 2/2014 | Frenne | H04L 5/0078 370/329 |
| 2014/0198742 A1* | 7/2014 | Baldemair | H04W 74/0833 370/329 |
| 2014/0376480 A1* | 12/2014 | Bergstrom | H04W 48/20 370/329 |
| 2015/0009813 A1* | 1/2015 | Nguyen | H04W 4/005 370/230 |
| 2015/0173105 A1* | 6/2015 | Bergstrom | H04W 74/006 370/329 |
| 2015/0373740 A1* | 12/2015 | Eriksson | H04W 74/0833 370/329 |
| 2016/0338093 A1* | 11/2016 | Frenne | H04W 72/1289 |

FOREIGN PATENT DOCUMENTS

| | | |
|---|---|---|
| WO | WO 2013/104118 A1 | 7/2013 |
| WO | WO 2013/138701 A2 | 9/2013 |
| WO | WO 2015/042714 A1 | 4/2015 |

OTHER PUBLICATIONS

"*Analysis and discussion on bandwidth reduction,*" R1-132879, 3GPP TSG RAN @G1 Meeting #74, Aug. 2013.

"*Study on provision of low-cost MTC UEs based on LTE,*" Releast 12, 3GPP TR 36.888, Jun. 2013.

"*Evolved Universal Terrestrial Radio Access (E-UTRA); Physical Channels and Modulation,*" 3GPP TS 36,211, V11.3.0, Jun. 2013.

"*Evolved Universal Terrestrial Radio Access (E-UTRA); Medium Access Control (MAC) protocol specification,*" 3GPP TS 36.321; V11.3.0; Jun. 2013,.

"*Evolved Universal Terrestrial Radio Access (E-UTRA); Radio Resource Control (RRC); Protocol specification,*"3GPP TS 36.331, V11.4.0, Jun. 2013.

RP-130848, "*New WI: Low cost & enhanced coverage MTC UE for LTE*", Vodafone, 3GPP TSG RAN meeting #60, Oranjestad, Aruba, Jun. 10-14, 2013.

"*Discussion on PUCCH and (e)PDCCH for coverage limited MTC UEs*", Huawei, HiSilicon, RAN WG1 Meeting #74, Barcelona, Spain, Aug. 19-23, 2013, R1-132884.

International Search Report and Written Opinion dated Dec. 4, 2014, for related International Application No. PCT/CA2014/ 050924 (WO 2015/042714).

Extended European Search Report issued on May 12, 2017, regarding EP 14 84 8676.

\* cited by examiner

METHOD AND APPARATUS FOR COMMUNICATING WITH LTE TERMINALS HAVING RESTRICTED CAPABILITIES

CROSS-REFERENCE TO RELATED APPLICATIONS

This application claims the benefit and priority of U.S. Provisional Application 61/883,116, filed Sep. 26, 2013. The foregoing application is incorporated by reference herein in its entirety.

FIELD OF THE INVENTION

The present invention pertains in general to wireless communications and in particular to wireless communication with LTE terminals which have restricted capabilities, such as low-cost user equipment (UE).

BACKGROUND

The Long Term Evolution (LTE) wireless communication standard potentially offers a high-capacity, high-speed wireless interface for use by mobile phones, data terminals, machine-type-communication (MTC) or machine-to-machine (M2M) equipment, and the like. However, in some instances it may be desirable to sacrifice aspects of an LTE terminal's performance (such as its data capacity) in order to gain other benefits, such as a reduced complexity and/or cost. The $3^{rd}$ Generation Partnership Project has considered such possibilities, for example in connection with "low-cost" or "limited capability" User Equipment (UE).

A feature of LTE is that it supports scalable carrier bandwidths from 1.4 MHz up to 20 MHz, in 1.4 MHz increments. This feature can be leveraged to provide for low-cost UEs by providing UEs which are only capable of operating over a relatively small portion of the total available 20 MHz maximum band. This allows the UE design to be simplified significantly and the associated cost can also be reduced. However, this approach is problematic in some respects.

For example the 3GPP discussion document "Analysis and discussion on bandwidth reduction," R1-132879, 3GPP TSG RAN WG1 Meeting #74, August 2013, considers a previously proposed scenario in which low-cost MTC UEs are provided with a reduced downlink channel bandwidth of 1.4 MHz for data channel in the baseband, with control channels (such as the Physical Downlink Control Channel (PDCCH)) which are still allowed to use the carrier bandwidth. In this scenario, the UE would be limited to a maximum data processing bandwidth of only 6 physical resource blocks (PRBs). As a result, common messages such as System Information Block (SIB), Random Access Response (RAR) and paging transmissions would generally be required to be transmitted via these 6 PRBs if they are expected to be received by such low-cost UEs. The implementation of this is a non-trivial problem.

Therefore there is a need for methods and systems for supporting limited capability UEs that is not subject to one or more limitations of the prior art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus for facilitating communication with LTE terminals that have restricted capabilities. In accordance with an aspect of the present invention, there is provided a Long Term Evolution (LTE) system comprising: a Limited Capability Terminal Equipment (LCTE) configured, upon initiating a physical random access channel (PRACH) random access operation, to select a PRACH preamble from a predetermined subset of PRACH preambles, said subset being strictly smaller than a set of all PRACH preambles used in the LTE system, the selected PRACH preamble included in wireless transmission of a PRACH preamble message; and an evolved Node B (eNB) configured, in response to receipt of the PRACH preamble belonging to said subset, to schedule transmission of an associated random access response (RAR) on a restricted set of physical resource blocks (PRBs) which is predictable and accessible to said LCTE.

In accordance with another aspect of the present invention, there is provided a method for facilitating random access communication in an LTE network between an eNB and a Limited Capability Terminal Equipment (LCTE), the method comprising: defining a subset of Physical Random Access Channel (PRACH) preambles for use by the LCTE, said subset being strictly smaller than a set of all PRACH preambles available for use; upon initiating a PRACH random access operation by the LCTE, selecting PRACH preambles from said subset for inclusion in transmission of a PRACH preamble message to the eNB; in response to receipt of a PRACH preamble belonging to said subset by the eNB, scheduling transmission of an associated Random Access Response (RAR) on a restricted set of Physical Resource Blocks (PRBs) which is predictable and accessible to said LCTE.

In accordance with another aspect of the present invention, there is provided an evolved Node B (eNB) servicing a Long Term Evolution (LTE) communication system, the eNB configured to: receive Physical Random Access Channel (PRACH) preamble messages from a plurality of Terminal Equipments (TEs) of the LTE system, said TEs including a Limited Capability Terminal Equipment (LCTE), at least one PRACH preamble from a predetermined subset of PRACH preambles, said subset being strictly smaller than a set of all PRACH preambles used by the plurality of TEs, the at least one PRACH preamble included in a corresponding PRACH preamble message; and upon receipt of the at least one PRACH preamble belonging to said subset, schedule transmission of an associated random access response (RAR) on a restricted set of physical resource blocks (PRBs) which is predictable and accessible to said LCTE, the restricted set of PRBs being strictly smaller than a set of all PRBs used in the LTE communication system.

In accordance with another aspect of the present invention, there is provided a Limited Capability terminal equipment (LCTE) for use in a Long Term Evolution (LTE) communication system, the LCTE configured, upon initiation of a physical random access channel (PRACH) random access operation, to: select a PRACH preamble from a predetermined subset of PRACH preambles, said subset being strictly smaller than a set of all PRACH preambles used in the LTE communication system; wirelessly transmit a PRACH preamble message including the selected PRACH preamble; predict and monitor a restricted set of physical resource blocks (PRBs) for a Random Access Response (RAR) to the PRACH preamble message, the restricted set of PRBs being strictly smaller than a set of all PRBs used in the LTE communication system, the RAR transmitted by an evolved Node B (eNB), wherein the eNB is configured, upon receipt of the PRACH preamble message containing the PRACH preamble belonging to said subset, to transmit the RAR on the restricted set of PRBs.

In accordance with another aspect of the present invention, there is provided a Long Term Evolution (LTE) system comprising: a Limited Capability Terminal Equipment (LCTE) configured, upon initiating a physical random access channel (PRACH) random access operation, to select a PRACH preamble from a predetermined subset of PRACH preambles, said subset being strictly smaller than a set of all PRACH preambles used in the LTE system, the selected PRACH preamble included in wireless transmission of a PRACH preamble message; and an evolved Node B (eNB) configured, in response to receipt of the PRACH preamble belonging to said subset, to adjust one or more operations pertaining to interaction with the LCTE in a manner which accommodates a limitation of the LCTE, said limitation indicated by membership of the PRACH preamble in the subset of PRACH preambles.

In accordance with another aspect of the present invention, there is provided a method for facilitating communication in an LTE network between an eNB and a Limited Capability Terminal Equipment (LCTE), the method comprising: defining a subset of Physical Random Access Channel (PRACH) preambles for use by the LCTE, said subset being strictly smaller than a set of all PRACH preambles available for use; upon initiating a PRACH random access operation by the LCTE, selecting PRACH preambles from said subset for inclusion in transmission of a PRACH preamble message to the eNB; in response to receipt of a PRACH preamble belonging to said subset by the eNB, adjusting one or more operations pertaining to interaction with the LCTE in a manner which accommodates a limitation of the LCTE, said limitation indicated by membership of the PRACH preamble in the subset of PRACH preambles.

BRIEF DESCRIPTION OF THE FIGURES

These and other features of the invention will become more apparent in the following detailed description in which reference is made to the appended drawings.

DETAILED DESCRIPTION OF THE INVENTION

Definitions

Figure 1:
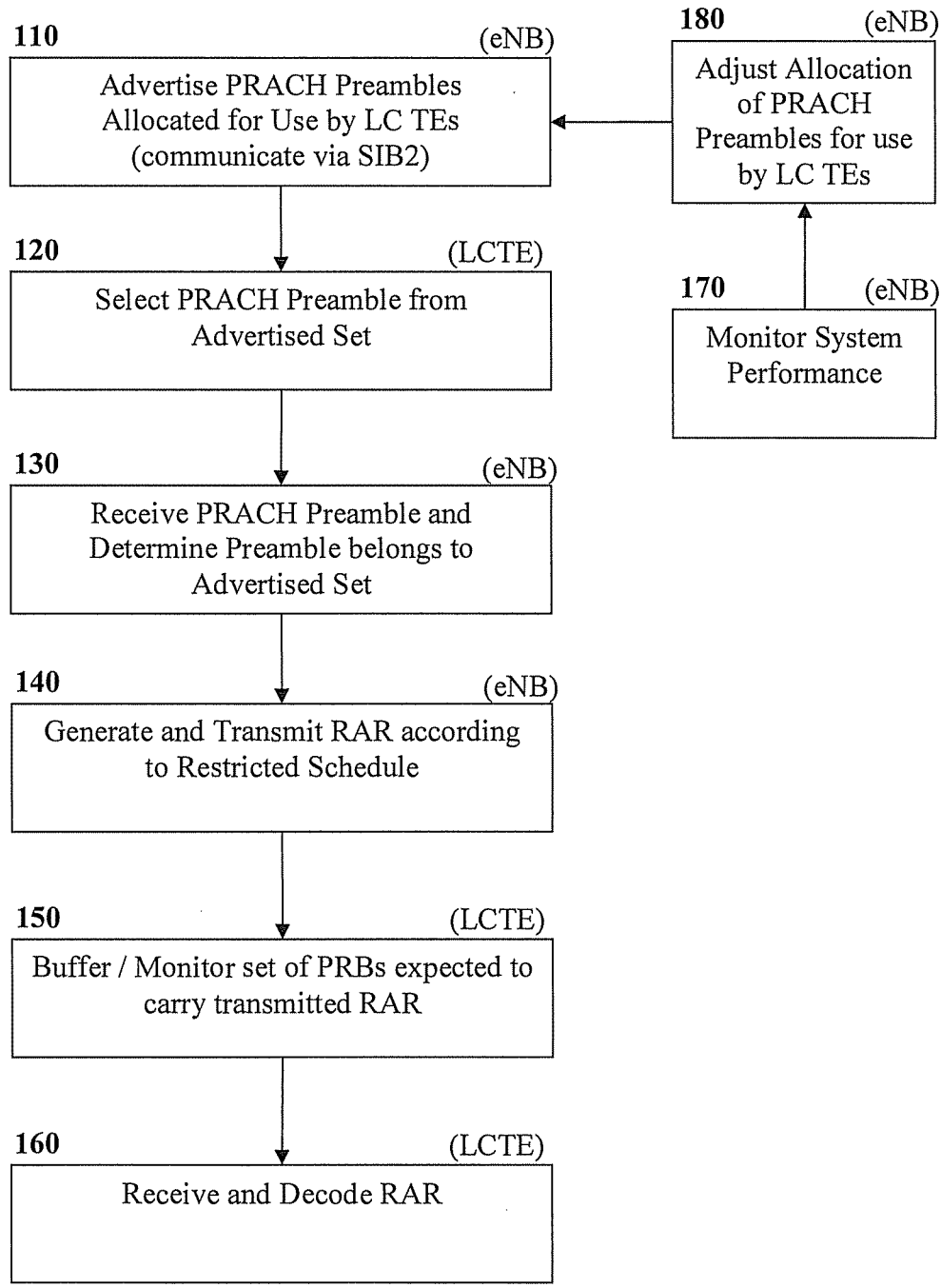
FIG. 1 illustrates a method for facilitating PRACH-related communication with TEs in accordance with embodiments of the invention.

The phrase "terminal equipment" is used herein rather than the LTE standard designation "user equipment" to signify that the devices under discussion are not necessarily associated with a particular user or used as personal communications devices. LCTEs may possibly be Machine-Type Communication (MTC) or Machine-to-Machine (M2M) devices, for example associated with remote meters, sensors, or other automated installations supporting various applications such as smart cities, agriculture, manufacturing, or the like. LCTEs may therefore include low-cost or limited capability wireless terminals either associated with automated equipment or, in some cases, used for personal communications.

As used herein, the term "about" refers to a +/−10% variation from the nominal value. It is to be understood that such a variation is always included in a given value provided herein, whether or not it is specifically referred to.

Certain embodiments of the present invention address the problem of how to perform the LTE random access procedure for TE terminals which are limited in their capability to fully monitor and/or timely decode certain downlink channels (referred to herein as "Limited Capability" or "low cost" TEs, (LCTEs)). LCTEs may have a restricted physical downlink shared channel (PDSCH) capacity, for example they may be capable of only monitoring and/or timely decoding 6 PRBs out of a potentially total 100 PRBs corresponding to a full 20 MHz LTE implementation. Potentially, LCTEs may be capable of fully monitoring and decoding other LTE channels over the full 20 MHz bandwidth, such as the PDCCH. LCTEs may further have restricted or non-restricted uplink capabilities. In currently used LTE random access procedure, the TE transmits a preamble sequence, including one of 64 PRACH (physical random access channel) preambles, to the evolved Node B (eNB). In response, the eNB transmits a Random Access Response (RAR) to the TE. The RAR is scheduled on the PDCCH and transmitted on the PDSCH. (The RAR is addressed to a temporary identity which was provided by the TE along with the preamble sequence.) The RAR includes information which is usable for further communication, including an initial uplink shared channel resource assignment. However, a LCTE may not be capable of timely receiving data transmitted on the particular portion of the PDSCH which was used to transmit a particular RAR.

In order to address the above, embodiments of the present invention comprise responding to a PRACH preamble sequence transmitted by a LCTE by scheduling transmission of the corresponding RAR on a limited set of Physical Resource Blocks (PRBs) known a priori and accessible to the LCTE. This facilitates reception of the RAR by the TE. In some embodiments, the limited set of PRBs is 6 PRBs in size, corresponding to the limited PDSCH capacity of the LCTE. The limited set of PRBs may be static or variable and defined by a function which is known by both the LCTEs and the eNB. The set of PRBs may be provided in an adjacent and continuous block, or spread out in frequency or time or both.

In one embodiment, the limited set of PRBs may be signalled to the TE through a control channel such as the PDCCH. In some embodiments, this approach is used substantially only in conjunction with preambles reserved for exclusive use by LCTEs, as described elsewhere herein. In this case the eNB will determine that the preamble was transmitted by an LCTE with high confidence.

A further issue with the current LTE preamble sequence transmitted by a TE does not generally identify whether the TE is a LCTE or another type of TE. Thus, currently each preamble sequence is treated substantially the same by the eNB. Further, it would be inefficient to schedule all RARs on the limited set of PRBs mentioned above, and this would waste the capabilities of other (e.g. legacy) types of TEs.

To address this issue, embodiments of the present invention provide a differentiating means for at least partially differentiating LCTEs from other types of TEs, and scheduling transmission of RARs on the limited set of PRBs only in response to a preamble sequence transmitted by a TE that is determined to possibly be a LCTE according to said differentiation means. In various embodiments, the differentiation means comprises configuring LCTEs to select a PRACH preamble only from certain predetermined subsets of the 64 available PRACH preambles, hereinafter the certain predetermined subset can be referred to as "LC preambles". When the eNB receives a LC preamble, eNB reacts as if the TE is a LCTE by scheduling the corresponding RAR on a limited set of PRBs which the LCTE is configured to buffer and/or decode. In some embodiments, other types of TEs may also use at least some of the LC preambles. In some embodiments, at least some of the LC preambles may be held for exclusive use of LCTEs. Thus, the PRACH preamble and RAR response behaviour of TEs may be channelized in a way that at least partially separates the manner in which this behaviour is executed for LCTEs from the manner in which this behaviour is executed for other TEs.

One approach for providing preambles for exclusive use by LCTEs is to allow LCTEs to utilize a subset of those PRACH preambles which are part of the set of contention free preambles, as defined in the existing LTE standard. These contention free preambles are currently reserved and assigned by the eNB for facilitating contention-free access over the PRACH. Other TEs operating according to the currently existing LTE standard will avoid using the reserved contention free preambles when operating in the contention-based regime. Furthermore, the eNB may be configured to avoid assigning these members of the set of contention free preambles in the contention-free regime. Thus, such preambles can be re-allocated for exclusive use by LCTEs by adjusting operation of the eNB, without a need for requiring corresponding reprogramming of legacy TEs.

It is further recognized that the number of LC preambles set aside for substantially exclusive and/or non-exclusive use by LCTEs may impact performance of the wireless communication system. For example, it is known that if different TEs attempt to concurrently use the same PRACH preamble (an issue in the contention-based random access regime), then a collision may result. Thus, if the number of LC preambles is too small for a given system, the probability of such collisions between LCTEs can increase. Similarly, if the number of exclusive LC preambles is too large (and hence the number of remaining preambles is too small), the probability of collisions between other types of TEs will likely increase. Furthermore, re-assigning preambles from the set of contention free preambles to the set of exclusive-use LC preambles may impact the ability for the eNB to allocate contention-free preambles in a timely manner. Therefore, embodiments of the present invention comprise monitoring one or more performance indicators, such as PDSCH capacity, relative utilization of PRACH preambles, preamble collision rates, and the like, and adjusting the number of LC preambles useable (either the total number of LC preambles or the number of LC preambles held in one or more subsets) in order to achieve a desired overall system performance. The current subsets of LC preambles of various types may be advertised by the system, for example via the SIB2 or other LTE information block.

FIG. 1 illustrates a method for facilitating PRACH-related communication with TEs in accordance with embodiments of the invention. The method comprises advertising 110, by the eNB, which of the available PRACH preambles are allocated for exclusive and/or non-exclusive use by LCTEs. Such advertisement may comprise transmitting related data in the SIB2 which is received and processed by the LCTEs as well as other TEs. The method further comprises selecting 120, by an LCTE, a PRACH preamble from the advertised set of preambles allocated for use by LCTEs. Such a selection is performed when the LCTE is required to initiate a PRACH-based communication. The selected preamble is then transmitted to the eNB by the LCTE. The method further comprises receiving the PRACH preamble and determining 130, by the eNB, that it belongs to the advertised set of preambles allocated for use by LCTEs. Such a determination may be made in accordance with a filtering process, which separates received PRACH preambles based on whether they belong to said advertised set. PRACH preambles not belonging to the advertised set may be processed as defined in the currently existing LTE standard. The method further comprises generating and transmitting 140, by the eNB, a RAR in response to the PRACH preamble in accordance with a restricted schedule, for example by scheduling the RAR for transmission via a set of PRBs which are signalled known and/or predictable to the LCTE. The method further comprises buffering and/or monitoring 150, by the LCTE, these signalled known and/or predictable PRBs in order to receive the RAR which is expected to be transmitted thereby. The method further comprises receiving and decoding 160, by the LCTE, the RAR via the buffered and/or monitored PRBs.

In some embodiments, as illustrated, the method further comprises monitoring 170, by the eNB, various system performance indicators, such as relative populations of LCTEs and other TEs, usage of various PRACH preambles, latency in the contention-free PRACH procedure, spectral efficiency, preamble collision rates, and the like, and adjusting 180, by the eNB, the sets of preambles allocated for exclusive and/or non-exclusive use by LCTEs in order to manage system performance.

Figure 2:
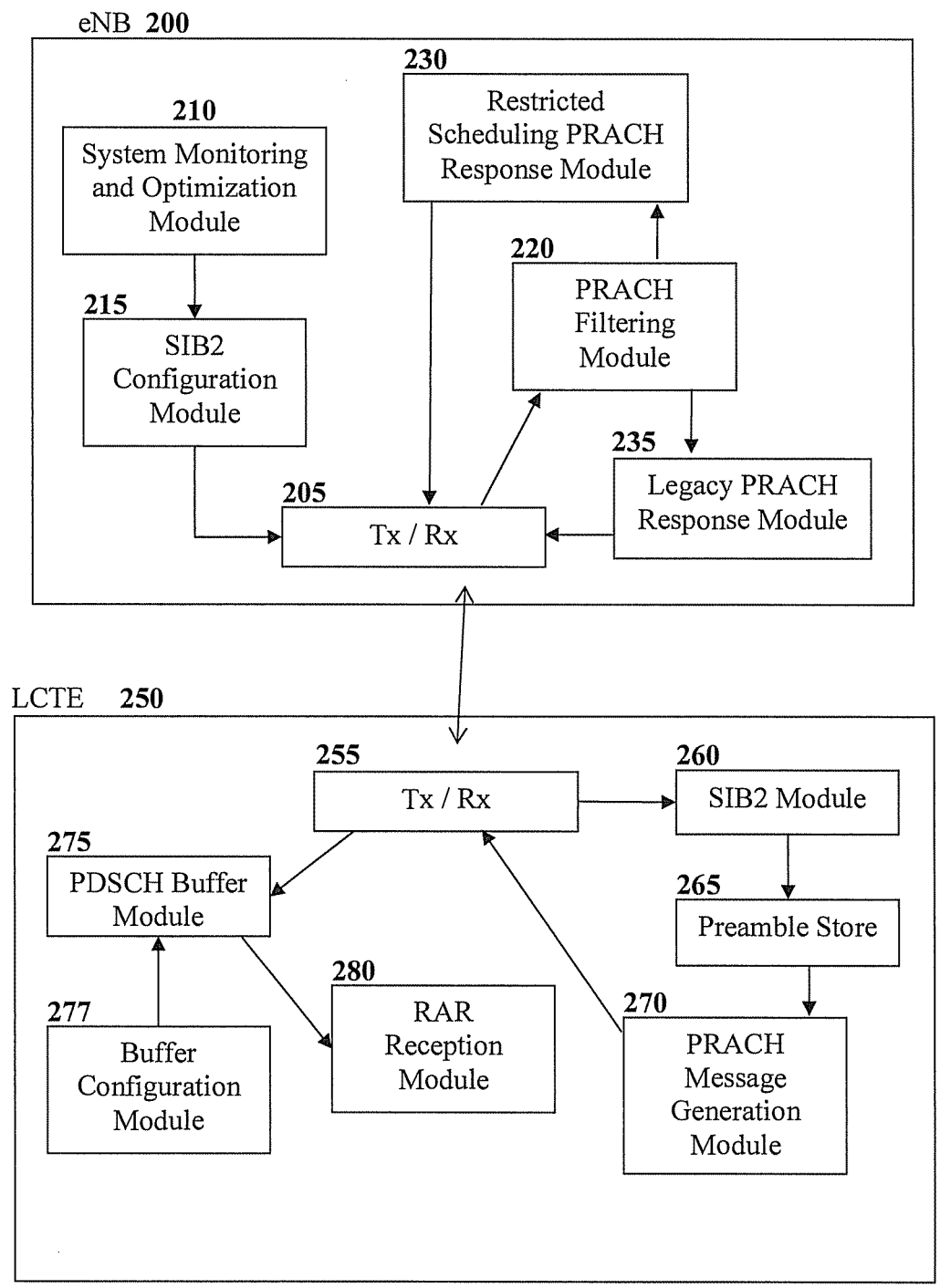
FIG. 2 illustrates a system for facilitating PRACH-related communication with TEs in accordance with embodiments of the invention.

FIG. 2 illustrates a simplified representation of a system for facilitating PRACH-related communication with TEs in accordance with embodiments of the invention. The system depicts a eNB 200 and a LCTE 250, although other TEs and infrastructure components will also typically be present.

As illustrated, the eNB 200 comprises a radio transceiver 205 which is a generalized representation of all wireless communication facilities for transmitting and receiving various communications, including but not limited to transmitting SIB2 messages and RAR messages, and receiving PRACH preamble messages. The eNB further comprises a system monitoring and optimization module 210, which is configured to monitor various system performance indicators and direct the allocation of PRACH preambles for exclusive and/or non-exclusive use by LCTEs. The system monitoring module informs and directs an SIB2 configuration module 215 which builds SIB2 messages for transmission by the transceiver 205. The eNB further comprises a PRACH filtering module 220 which is configured to process PRACH preamble messages received by the transceiver 205. If a PRACH preamble message includes a preamble belonging to the set of PRACH preambles allocated for exclusive and/or non-exclusive use by LCTEs, then it is passed on to the Restricted Scheduling PRACH Response module 230 for handling. Otherwise, the message is passed on to the Legacy PRACH Response module 235 for handling. The Restricted Scheduling PRACH Response module 230 is configured to generate and schedule a RAR on a restricted set of PRBs which is known and/or predictable to the LCTE. The Legacy PRACH Response module 235 is configured to generate and schedule a RAR in accordance with the existing or prior art LTE standard. Additionally, the Legacy PRACH Response module may be configured to coordinate with the Restricted Scheduling PRACH Response module in order that transmissions by both modules do not conflict. PRACH responses may be generated taking into account LCTE allocations which are either exclusive or non-exclusive.

As also illustrated, the LCTE 250 also comprises a generalized transceiver 255 for wireless transmission and reception. The LCTE further comprises a SIB2 module 260 which is configured to receive and process SIB2 messages from the eNB, and to update a store 265 of preambles which are allocated for exclusive and/or non-exclusive use by LCTEs. The LC TE 250 is configured to select PRACH preambles from the store 265 when generating a PRACH preamble message. A PRACH message generation module 270 generates the PRACH preamble messages and provides same to the transceiver 255 for transmission. The LCTE further comprises a PDSCH buffer module 275 which is configured to buffer a certain portion of the PDSCH for processing. In particular, following transmission of a PRACH message, a buffer configuration module 277 of the LCTE configures the PDSCH buffer module 275 to buffer a portion of the PDSCH which is anticipated to carry the associated RAR from the eNB. The buffer configuration module may be configured to evaluate a predetermined function which indicates the relevant portion of the PDSCH, for example. The LCTE also includes a RAR reception module 280 which is configured to read the PDSCH buffer module 275 at the appropriate time in order to receive the RAR which is transmitted in response to the previously generated PRACH message.

As will be readily understood, various modules and components of the eNB 200 and LCTE 250 may be implemented via existing and/or dedicated electronic components of a substantially standard eNB and/or LCTE, such as microprocessors executing instructions stored in memory, digital signal processors, microcontrollers, other LTE RF or baseband hardware components, and the like.

Limited Capability Terminal Equipment (LCTE)

As mentioned above, LCTEs may have a restricted PDSCH capacity, for example LCTEs can be restricted to receiving data on a given 6 PRBs which is less than the total number of PRBs used for the PDSCH in a current LTE implementation. However, the 6 PRB restriction described herein is not limiting. Rather the LCTEs may be restricted to another number of PRBs in relation to the PDSCH, such as 12 PRBs, 24 PRBs, or the like. Additionally or alternatively, one or more other capacity restrictions, such as a bandlimited receiver, limited channel buffering capabilities, limited processing speed, limited signal reception capability, limited energy supply, time limitations, message size limitations, or the like, may be present in an LC TE.

For example, an LCTE which has a restricted PDSCH data capacity of only 6 PRBs, rather than the capacity to buffer the full PDSCH of potentially 100 PRBs, will have a lower cost due at least in part to the decreased buffer size.

According to embodiments, wireless environments may include a large number of LCTEs, for example in association with a corresponding large number of MTC terminals which have different communication requirement profiles than typical existing TEs.

In various embodiments, LCTEs may have characteristics as described in the 3GPP technical report "Study on provision of low-cost MTC TEs based on LTE," Release 12, 3GPP TR 36.888, June 2013. Such characteristics may potentially correspond to limitations which may be accommodated by the eNB.

Brief Review of LTE Random Access Procedure

As will be readily understood by a worker skilled in the art, TEs are capable of initiating contact with the eNB via a random access procedure on the Physical Random Access Channel (PRACH). Generally, the TE selects an available PRACH preamble and transmits this preamble in a first message to the eNB via the PRACH. The first message is also indicative of a Random Access Radio Network Temporary Identity, or RA-RNTI. If the selected PRACH preamble is concurrently being used by another TE attempting random access, a collision may occur. If the eNB successfully receives the first message, it responds with a Random Access Response (RAR) which is scheduled on the PDCCH and transmitted on the PDSCH. The RAR is addressed to the TE using the RA-RNTI and carries information such as a temporary Cell Radio Network Temporary Identifier (C-RNTI), a timing advance value for use in compensating for round trip delay, and an initial uplink grant resource for use by the TE in accessing the Uplink Shared Channel (UL-SCH). The TE then typically responds by transmitting a connection request via the PUSCH, and the eNB further responds by transmitting a contention resolution message which is again scheduled on the PDCCH and transmitted on the PDSCH.

Random access may follow a contention-based regime or a contention-free regime. In the contention-based regime, TEs select their PRACH preamble blindly from a non-reserved set. In the contention-free regime, TEs are assigned their PRACH preamble from a reserved set by the eNB, in such a manner that no two TEs are concurrently assigned the same reserved preamble.

Various details of the LTE random access procedure will be readily understood by a worker skilled in the art, and with reference for example to documents such as "Evolved Universal Terrestrial Radio Access (E-UTRA); Physical Channels and Modulation," 3GPP TS 36.211, V11.3.0, June 2013, "Evolved Universal Terrestrial Radio Access (E-UTRA); Medium Access Control (MAC) protocol specification," 3GPP TS 36.321, V11.3.0, June 2013, "Evolved Universal Terrestrial Radio Access (E-UTRA); Radio Resource Control (RRC); Protocol specification," 3GPP TS 36.331, V11.4.0, June 2013, and the like. A total of 64 PRACH signatures are potentially available in LTE, which leads to a reduced collision probability, and also allows for information to be carried by the preamble by selecting a preamble from either Group A or Group B.

Typically, the RACH is present in 6 successive resource blocks, which leads to 72 subcarriers (twelve 15 kHz subcarriers per resource block). For the PRACH preamble, each subcarrier space is 1.25 kHz, so that one 15 kHz band equals 12 PRACH subcarriers. This leads to a potential total of 864 (12*72) PRACH subcarriers, 25 of which are used as guard subcarriers, leading to 839 PRACH subcarriers.

eNB Allocation and Advertising of Preamble Sequences

Figure 3:
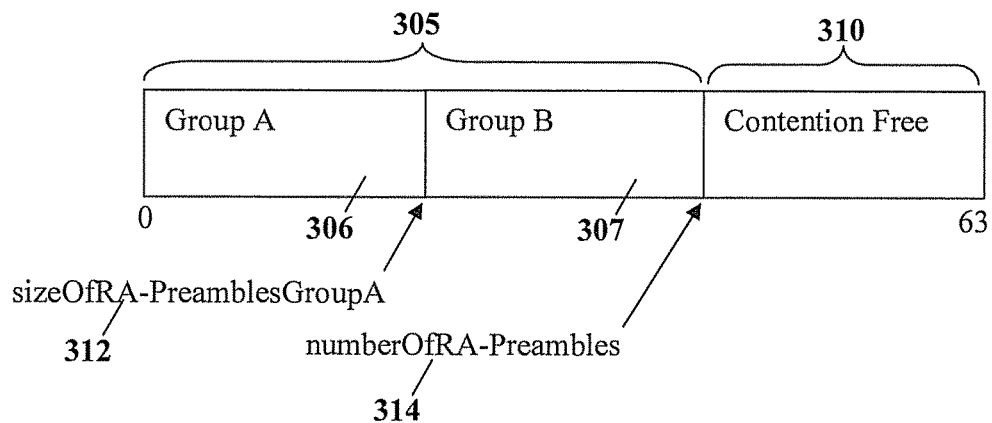
FIG. 3 illustrates an allocation of PRACH preambles in accordance with the prior art.

Currently, a defined number (for example equal to but not limited to 64) PRACH preambles are available for use in LTE. As illustrated in FIG. 3, the eNB reserves a certain number 310 of these preambles for assignment to TEs in accordance with a contention-free regime, and the remainder 305 are free for selection by TEs in the contention-based regime. Furthermore, the contention-based preambles are subdivided into Group A preambles 306 and Group B preambles 307. This allows TEs to communicate one bit of information to the eNB by selecting a preamble from a given group. For example, selecting a Group A or Group B preamble may indicate that the TE has a message to send that is under a threshold size or over a threshold size, respectively. As another example, selecting a Group A or Group B preamble may indicate an amount of transmission resources required to transmit a subsequent message on the PUSCH, for example due to message size, signal strength, or the like. Currently, the eNB advertises which preambles are reserved for the contention-free regime, and which preambles are allocated to Group A and Group B, by setting corresponding fields in the regularly transmitted SIB2 System Information Block. For example, the boundary 314 between the contention-based preambles 305 and the contention-free preambles 310 may be defined by the standard SIB2 field "numberofRA-Preambles," while the boundary 312 between Group A and Group B preambles may be defined by the standard SIB2 field "sizeOfRA-PreamblesGroupA."

Figure 4:
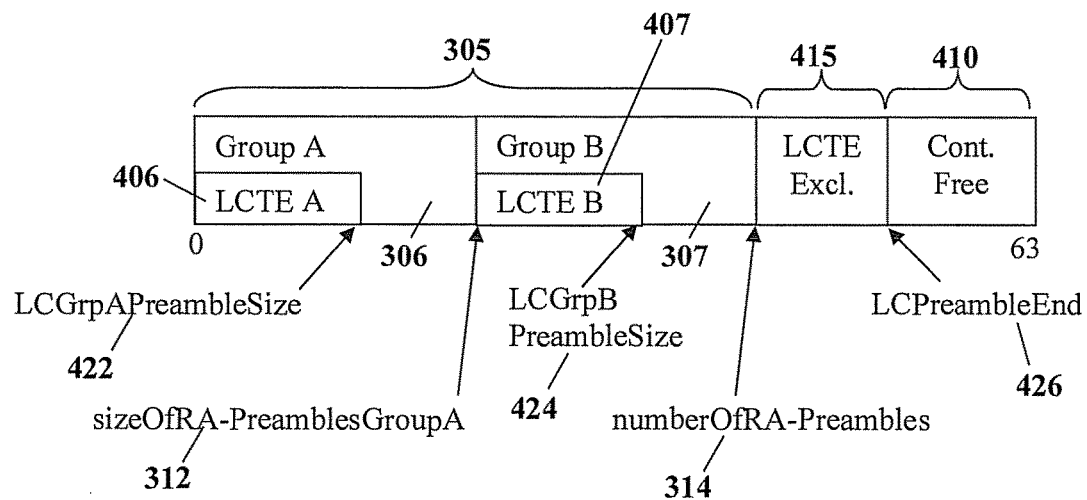
FIG. 4 illustrates an allocation of PRACH preambles in accordance with embodiments of the invention.

In accordance with embodiments of the present invention, the allocation of PRACH preambles is altered by further allocating some of the Group A and/or Group B preambles for non-exclusive use by LCTEs. These allocations may be communicated by the eNB via one or more additional fields in the SIB2, for example. These additional fields may be monitored by LCTEs and may change over time as the eNB tunes the allocation in order to improve or maintain system performance. LCTEs are configured to avoid using Group A and/or Group B preambles which have not been allocated for their non-exclusive use. Other TEs, such as legacy TEs, may use any Group A or Group B TE. However, in some embodiments some TEs may be configured to monitor the allocation of preambles allocated for non-exclusive by LCTEs and avoid using such preambles, for example in order to reduce a perceived increase in collision probability in the presence of a large number of LCTEs. FIG. 4 illustrates an example of the above allocation in accordance with embodiments of the present invention. In addition to the allocations in FIG. 3, the set of Group A preambles 306 includes a subset of preambles 406 allocated for non-exclusive use by LCTEs, and the set of Group B preambles 307 includes a subset of preambles 407 allocated for non-exclusive use by LCTEs. These subsets 406 and 407 may be strictly smaller in size than the sets 306 and 307, respectively. Furthermore, the contention-free preambles 310 of FIG. 3 are replaced in FIG. 4 by a reduced set of contention-free preambles 410 and a separate set of preambles 415 reserved for exclusive use by LCTEs. The union of the two sets 410 and 415 is equal to the set 310 of FIG. 3.

The sets 406, 407 and 415 may be defined via SIB2 fields. For example, the set 406 may start at the lowest-valued preamble in Group A and end at a value communicated by a new SIB2 field "LCGrpAPreambleSize" 422. The set 407 may start at lowest-valued preamble in Group B and end at a value communicated by a new SIB2 field "LCGrpBPreambleSize" 424. The set 415 may start at a value defined by the existing parameter "numberofRA-Preambles" 314 and end at a value communicated by a new SIB2 field "LCPreambleEnd" 426. Any of these new sets may be omitted from use by appropriate setting of the new SIB2 parameters.

In accordance with some embodiments of the present invention, the allocation of PRACH preambles is altered by further allocating some of the preambles for exclusive use by LCTEs. In some embodiments, in order to prevent legacy TEs from using advertised Group A and Group B preambles intended for LCTEs, the eNB advertises (via existing fields in the SIB2) that these preambles belong to the pool of contention-free preambles. However, the eNB may be configured to avoid assigning these "exclusive use" preambles in the contention-free regime, thereby preserving their exclusivity. The pool of contention-free preambles will generally include other preambles that can be assigned to TEs in the contention-free regime. Furthermore, LCTEs may be configured to use the set of exclusive use preambles in the contention-based regime regardless of the advertisement by the eNB that these are reserved for the contention-free regime. To facilitate this, the eNB may advertise, for example via an additional field in the SIB2, which of the preambles are allocated for exclusive use by LCTEs and which are allocated for contention-free use by other TEs.

In various embodiments, preambles may be allocated for one or both of exclusive use by LCTEs and non-exclusive use by LCTEs. In some embodiments, preambles allocated for non-exclusive use by LC TEs may include one or both of Group A and Group B preambles.

In some embodiments, different preambles may be used to communicate different LCTE limitations or sets of limitations to the eNB. For example, Group A preambles may communicate one limitation, while Group B preambles may communicate another limitation. Further, Group A and/or Group B preambles may be further divided into subsets of one or more preambles each, wherein each subset can be used to communicate a particular limitation or set of limitations of the LCTE.

TE Selection and Transmission of Preamble Sequence

As mentioned above, TEs other than LCTEs may be configured to select preambles in accordance with the existing LTE standard, that is, by selecting a Group A or Group B preamble as guided by the allocation advertised by current SIB2 messages.

As also mentioned above, LCTEs may be configured to select preambles which are allocated (by the eNB and as advertised in current SIB2 messages) for non-exclusive or exclusive use by LCTEs. In various embodiments, an LCTE may select a Group A or Group B preamble from a set of preambles allocated for non-exclusive use thereby. A benefit of selecting such a preamble is that the eNB is configured to respond to such preambles in a manner which is more appropriate for LCTEs, as described in more detail below.

eNB Response to Preamble Sequence

In embodiments of the present invention, upon receipt of a PRACH message including a PRACH preamble in accordance with the LTE random access procedure, the eNB first determines whether the PRACH preamble is allocated for (exclusive or non-exclusive) use by a LCTE. If not, the eNB responds with a RAR message in the normal way as described in the current LTE standard. Otherwise, the eNB responds by adjusting operation to accommodate the restrictions of the LCTE. For example, the eNB may respond with a RAR message which is scheduled and transmitted in a particular way, accounting for the restrictions of the LCTE. This transmission is referred to herein as transmission of a LC-RAR. The manner of the RAR transmission is backward compatible, such that if the TE is not a LCTE but is simply using a non-exclusive preamble, the RAR can still be received by the non-LCTE.

In some embodiments, transmission of a RAR message to a LCTE may comprise transmission with increased gain, such as increased coding gain. For example, RAR transmission in response to a PRACH preamble which is allocated for exclusive use by LCTEs may utilize increased coding gain to compensate for an expected lower receiver sensitivity of certain types of LCTEs (for example those with only a single receiver and/or no MIMO gain). In some embodiments, if the PRACH preamble is allocated for non-exclusive use by LCTEs, increased gain may be optional and/or gain may be increased to a lesser degree than if the PRACH preamble were allocated for exclusive use by LCTEs. In some embodiments, particular preambles may be used by LCTEs if higher gain is required in the RAR.

In various embodiments, the eNB is configured to transmit a LC-RAR by scheduling its transmission on the PDSCH via a predetermined set of PRBs which are known a priori and also accessible to the target TE. The target TE may be configured to buffer these known PRBs in order to facilitate reliable reception of the LC-RAR. This may simplify TE operation since less than the entire PDSCH is buffered. For example, in some embodiments only these known PRBs are buffered by the TE when executing a PRACH operation. The LC-RAR transmission may be scheduled on the PDCCH similarly to standard RARs.

Alternatively, in some embodiments, if the LC-RAR's size (# of PRBs), MCS, and the sub-frame time is also known a priori to the LCTE (e.g. via SIB parameters) then, if the transmission of the LC-RAR is to a LCTE, the LCTE may potentially be configured to ignore the PDCCH scheduling since it already knows the LC-RAR transmission schedule. Thus if the LC-RAR is being transmitted in response to a non-exclusive preamble, scheduling on the PDCCH may potentially be omitted by the eNB. In various embodiments, the LC-RAR is transmitted via 6 PRBs which correspond to the 6 PRBs which the LCTE is capable of receiving and/or buffering in its limited capacity. Alternatively, if the LCTE does not have a priori knowledge of all of the above-mentioned information, but is capable of performing adequate blind decoding, PDCCH scheduling may similarly be omitted.

In some embodiments, a static set of PRBs, for example 6 PRBs, is defined, and LC-RAR messages are always transmitted via the static set. This provides predictability of scheduling in a simple manner. However, it may cause particular spectral resources to be over-used. Frequency selection diversity for combating fading may also be negatively impacted in this case.

In some embodiments, a function which assigns which PRBs are to be used for transmitting LC-RAR messages may be defined. This function is known and used by the eNB and the LCTEs. The function may be variable with respect to attributes such as time, System Frame Number (SFN), RA-RNTI, preamble number, other system attributes, or the like, or a combination thereof. The function may allocate PRBs in a contiguous group or spread the PRBs across frequency and/or time.

For example, some such functions provide a 1-to-1 mapping from the RA-RNTI (0-9) (the subframe the preamble was sent in) and the PRACH preamble chosen (0-63) to the 6 PRBs used for the RAR on PDSCH. A particular example of such a function defines the starting one of the 6 PRBs by:

StartingPRB#=mod(preamble#+#Preambles*RA-RNTI,MaxPRBs-5), where StartingPRB# is the ordinal value of the starting PRB of the 6 PRBs (counting from zero) and where the remaining PRBs may follow consecutively or non-consecutively at pre-defined intervals, MaxPRBs is the number of PRBs supported in the band (e.g. 100 PRBs for a 20 MHz maximum band), and #Preambles corresponds to the field "numberOfRA Preambles" transmitted in SIB2.

As another example, if the 6 PRBs do not need to be adjacent and continuous, the PRBs may be spread across the band so that some frequency diversity is provided. In this case, the function may define each of the (for example) 6 PRB locations separately by a function PRB#(n)=Function (n, #ofpreambles, preamble#, RA-RNTI, MaxPRBs,SFN) where n=[0-5]. In some embodiments, this function may be a parameter that is shared between the eNB and TE at this point in the system acquisition. In various embodiments, the function may be defined such that it spreads the PRBs evenly across the band and does not overload any PRBs.

Additionally or alternatively, the eNB may respond to receipt of certain PRACH preamble sequences in one or more other predetermined manners. In various embodiments, PRACH preambles (or groups thereof) may be defined which may be used by a terminal equipment to indicate a certain limitation or combination of limitations.

In some embodiments, one such limitation includes a limitation on PRB reception capabilities with respect to the RAR, for example a limitation in which the LCTE is capable of receiving only a certain number of PRBs, such as 6 PRBs, as described elsewhere herein.

In some embodiments, one such limitation includes a limitation on reception signal level capabilities of the LCTE. In some embodiments, the PRACH preamble may further indicate, via its identity or group membership, how the limitation is to be addressed by the eNB. In other embodiments, the PRACH preamble may refrain from indicating how the limitation is to be addressed, in which case the eNB may select a mechanism for addressing the limitation. One such mechanism for addressing a limitation on reception signal level capabilities of the LCTE includes transmitting from the eNB with increased gain, such as increased coding gain. Another mechanism includes providing enhanced coverage treatment of the LCTE by the eNB. Enhanced coverage treatment may include a restriction of coding by the eNB to lower complexity options such as QPSK, a requirement for multiple repetitions of transmissions from the eNB, increased Hybrid ARQ (HARM) coding, stronger coding schemes for increased transmission robustness and lower error rates, longer allowances for response times, and the like.

In some embodiments, one such limitation includes an energy limitation, such as a limitation on battery life of the LCTE or an operational requirement for enhanced battery life of the LCTE. In response to such a limitation, the eNB may reconfigure its interaction with the LCTE to accommodate the energy limitation. For example, the eNB may transmit to the LCTE only within certain time windows after possibly extended periods of known delay. As another example, the eNB may extend timeout parameters or response time tolerances for such LCTEs. Such behaviour may accommodate LCTEs which are configured to only transmit or receive messages at certain intervals, for example due to predetermined sleep/wake cycles designed to conserve energy. In some embodiments, the PRACH preamble may indicate parameters of a sleep/wake schedule followed by the LCTE.

In some embodiments, one such limitation includes a limitation on message size and/or transport block size. To accommodate such a limitation, the eNB may limit the size of certain messages or transport blocks transmitted to the LCTE to a predetermined maximum size. Larger messages may be subdivided into multiple messages to accommodate the limitation. Message types to which the limitation applies and/or the maximum size may optionally be indicated via the PRACH preamble's identity or group membership.

It is noted that other limitations of LCTEs may be indicated and accommodated in a suitable manner and are considered within the scope of the instant application. PRACH preambles may correspond to limitations that are accommodated by the eNB in the RAR and/or limitations that are accommodated by the eNB in other ways, for example in other transmissions to the LCTE by the eNB or in uplink treatment of the LCTE by the eNB.

In various embodiments, PRACH preambles indicative of the above limitations or combinations of limitations may be reserved for exclusive use by LCTEs or designated for non-exclusive use. In some embodiments, if a limitation would trigger a response by the eNB which is deemed to have a high impact on network operations, PRACH preambles triggering same may be reserved for exclusive use by LCTEs requiring same. In this manner, relatively extreme accommodations by the eNB may be avoided unless required to accommodate a particular LCTE.

In some embodiments, PRACH preambles indicative of different limitations or sets of limitations may be divided into different overlapping or non-overlapping groups of PRACH preambles. In other embodiments, only one group of PRACH preambles, indicative of one limitation or set of limitations, is present. When overlapping, one group may or may not be strictly contained within another group. For example, PRACH preambles within a first range may indicate that an LCTE has a limitation on PRB reception capabilities with respect to the RAR and that the eNB should schedule transmission of an associated random access response (RAR) on a restricted set of physical resource blocks (PRBs) which is predictable and accessible to the LCTE. PRACH preambles within a second range, contained within the first range, may indicate that the LCTE also has a limitation on reception signal level capabilities. Further ranges of PRACH preambles may be provided and indicative of other limitations.

Figure 5:
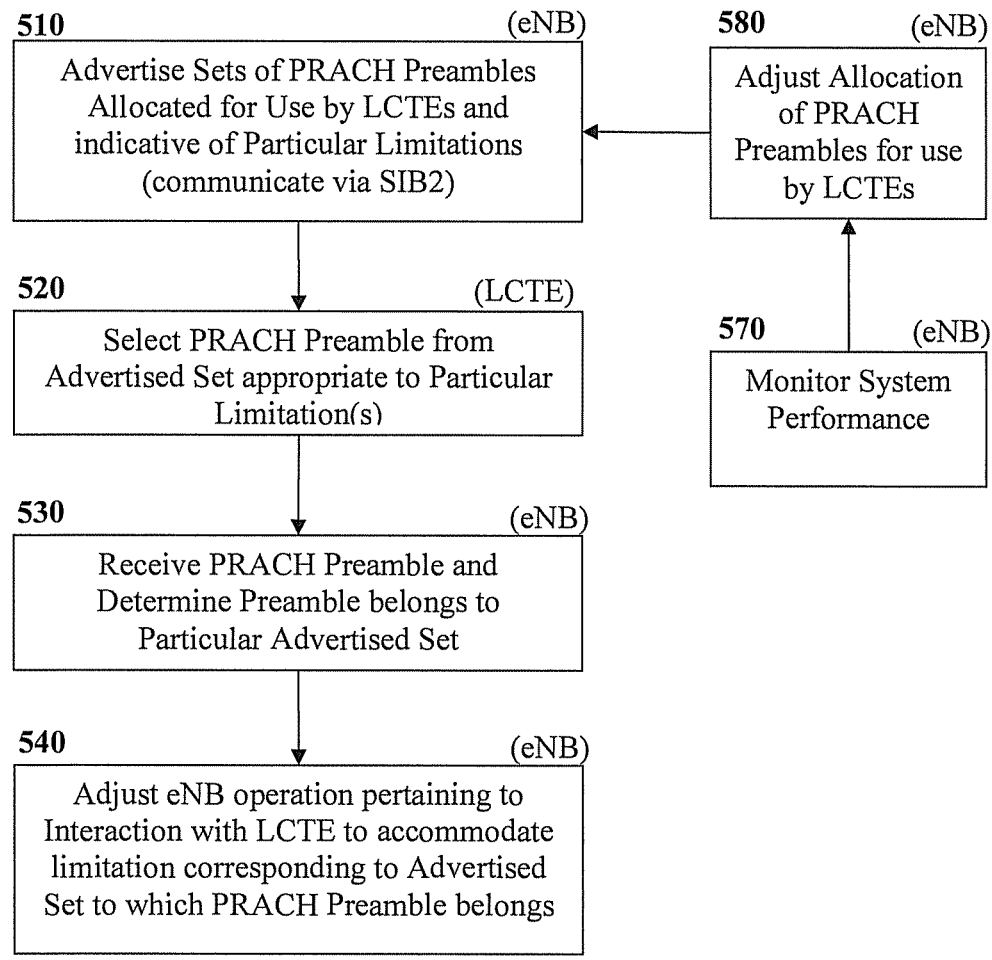
FIG. 5 illustrates a method for facilitating PRACH-related communication with TEs in accordance with embodiments of the invention.

FIG. 5 illustrates a method for facilitating communication with LCTEs in accordance with embodiments of the invention. The method comprises advertising 510, by the eNB, for example via the SIB2, which of the available PRACH preambles are allocated for exclusive and/or non-exclusive use by LCTEs. The advertisement may designate which PRACH preambles are allocated for use to designate one or more LCTE limitations or one or more sets of limitations. The method further comprises selecting 520, by an LCTE, a PRACH preamble from the advertised sets of preambles. The LCTE selects, if appropriate, a PRACH preamble which corresponds to one or more of its limitations. The selected preamble is then transmitted to the eNB by the LCTE. The method further comprises receiving the PRACH preamble and determining 530, by the eNB, that it belongs to a particular advertised set of preambles allocated for use by LCTEs and designating a particular limitation or set of limitations. Such a determination may be made in accordance with a filtering process, which separates received PRACH preambles based on whether they belong to an advertised set and, where applicable, which set they belong to. PRACH preambles not belonging to an advertised set may be processed as defined in the currently existing LTE standard. The method further comprises adjusting 540 eNB operation relating to interaction with the LCTE in a manner which accommodates the LCTE's limitations as indicated by way of the PRACH preamble.

In some embodiments, as illustrated, the method further comprises monitoring 570, by the eNB, various system performance indicators and adjusting 580, by the eNB, the one or more sets of preambles allocated for exclusive and/or non-exclusive use by LCTEs and allocated for indicating various limitations of LCTEs to manage system performance.

Figure 6:
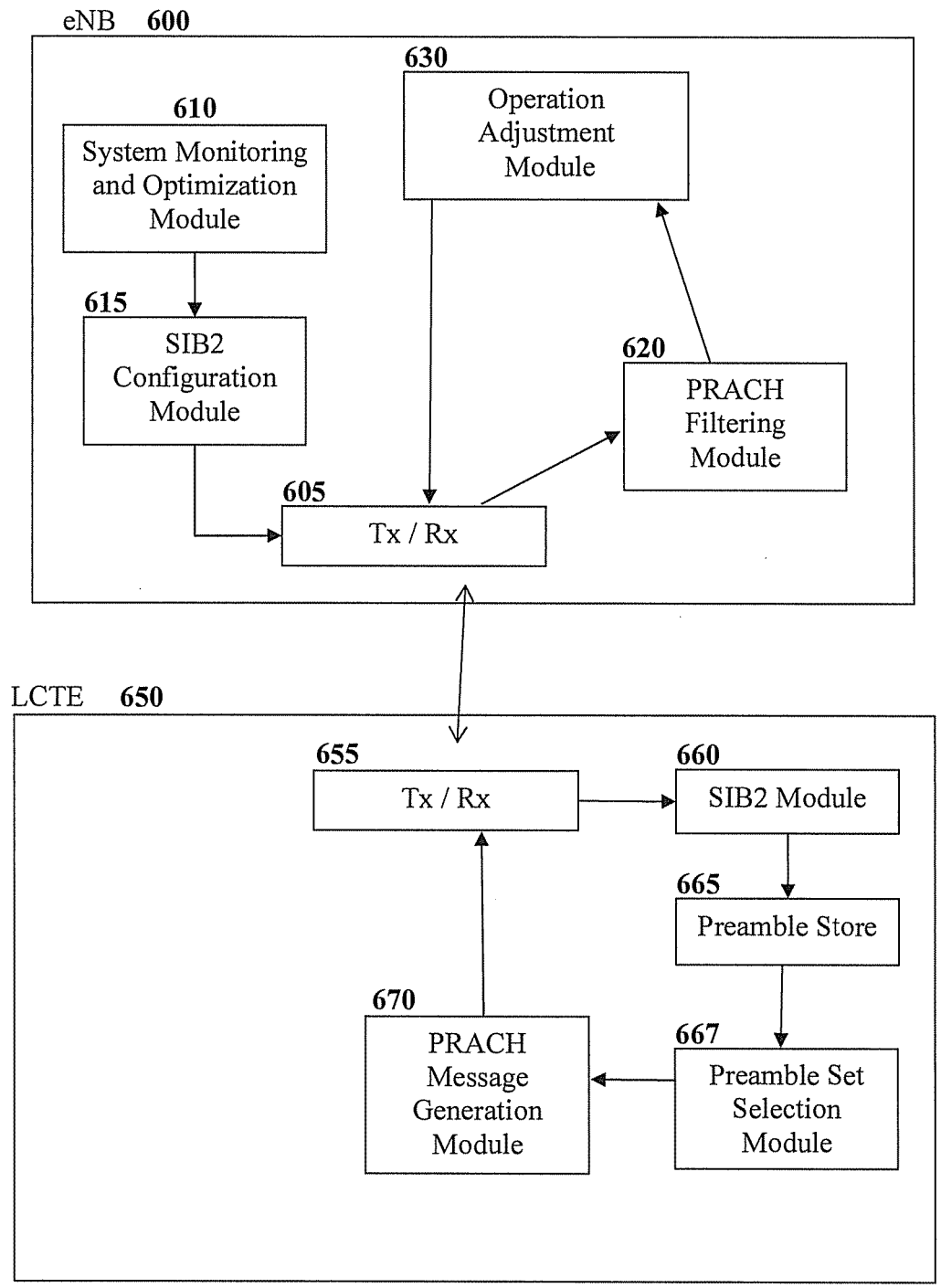
FIG. 6 illustrates a system for facilitating PRACH-related communication with TEs in accordance with embodiments of the invention.

FIG. 6 illustrates a system for facilitating communication between an eNB 600 and a LCTE 650, in accordance with some embodiments. As illustrated, the eNB 600 comprises a radio transceiver 605. The eNB further comprises a system monitoring and optimization module 610, which is configured to monitor various system performance indicators and direct the allocation of PRACH preambles for exclusive and/or non-exclusive use by LCTEs as well as the allocation of one or more sets of PRACH preambles for potentially indicating different limitations of LCTEs. The system monitoring module informs and directs a SIB2 configuration module 615 which builds SIB2 messages for transmission by the transceiver 605. The eNB further comprises a PRACH filtering module 620 which is configured to process PRACH preamble messages received by the transceiver 605. If a PRACH preamble message includes a preamble belonging a particular the set of PRACH preambles allocated for exclusive and/or non-exclusive use by LCTEs and indicative of a particular recognized limitation or set of limitations of the LCTE, then the PRACH filtering module 620 triggers the operation adjustment module 630 to adjust eNB operations pertaining to interaction with the LCTE in a manner which accommodates the particular indicated limitations of the LCTE. This may include adjusting generation and scheduling of a RAR transmitted in response to the PRACH preamble.

Also as illustrated, the LCTE 650 also comprises a transceiver 655 for wireless transmission and reception. The LCTE further comprises a SIB2 module 660 which is configured to receive and process SIB2 messages from the eNB, and to update a store 665 indicating PRACH preambles which are allocated for exclusive and/or non-exclusive use by LCTEs. The store 665 may also indicate different sets of PRACH preambles usable to indicate different LCTE limitations to the eNB. The preamble selection module 667 is configured to select PRACH preambles from the store 665 when generating a PRACH preamble message, said selection potentially based on a limitation of the LCTE. A PRACH message generation module 670 generates the PRACH preamble messages and provides same to the transceiver 655 for transmission.

Coexistence of LCTEs with Other TEs

It is noted that, in various embodiments, an LTE network may include both LCTEs and other TEs, such as potentially high-speed, high-bandwidth TEs. Various embodiments of the present invention are directed toward facilitating efficient coexistence between different types of TEs provided in different proportions. The LTE network may automatically adjust its parameters in order to accommodate different populations of TEs.

eNB Adjustment of Preamble Sequence Allocation

As noted above, adjustment of preamble sequence allocation may be performed by adjusting fields within SIB2 messages transmitted by the eNB, or other system information messages. Adjustments may be performed periodically or on an as-needed basis in order to maintain various aspects of system performance, such as latency, congestion, spectral efficiency, usability, reliability, and the like.

In some embodiments, it is expected that Group A and/or Group B preambles which are allocated for non-exclusive use by LCTEs will be utilized more often than the other Group A and/or Group B preambles, respectively. Therefore, an idealized scenario in which every preamble is used with the same frequency is unrealistic. In other words, some of the preambles are "overloaded" by LCTEs. However, adjustment of the PRACH preamble allocation may still be performed in order to distribute preamble utilization.

For example, if average utilization of Group A preambles allocated for non-exclusive use by LCTEs exceeds overall average utilization of Group A preambles by at least a predetermined factor, then additional Group A preambles may generally be added to the allocation for non-exclusive use by LCTEs. Likewise, the allocation may be reduced in the reverse situation.

As another example, if the number of contention-free preambles is currently too small or too large, as measured by the average wait time for a contention-free preamble to become available, the number of contention-free preambles may be increased or decreased, respectively, with a corresponding decrease or increase in the number of preambles allocated for exclusive use by LCTEs.

Adjustments of various sizes of preamble groups may be performed based on a variety of criteria, and indeed may be performed in order to balance competing criteria. Various overall system performance measures, or plural concurrent measures, may be defined and optimized by adjusting the various sizes of preamble groups. Parameters such as capacity and demand parameters may be used to govern decisions about whether and how many preambles should be allocated for exclusive and/or non-exclusive use by LCTEs.

In some embodiments, the set of preambles for exclusive use by LCTEs may be introduced and/or increased based on a determination that there is sufficient PRACH resource demand by LCTEs. That is, such a set of preambles may be assigned once LCTE PRACH demand becomes larger than a predetermined threshold, and in some embodiments increased at a predetermined rate with demand.

In some embodiments, the need for an allocation of "exclusive LCTE use" preambles, and similarly the need to only allocate parts of the Group A and B preambles, may depend on how much degradation in latency and capacity is anticipated due to the resulting restrictive scheduling on the PDSCH. This in turn may depend on the utilization factor of the PDSCH resources, assuming it is capacity limited.

In some embodiments, for example, if all preamble sequences were allocated for use by LCTEs, then all RARs would be scheduled in the restricted manner, that is to deterministic, known and/or predictable PDSCH PRBs. This may tend to restrict the eNB scheduler and increase latency and reduce system efficiency, even if the RARs are spread out across the band as outlined above. It may therefore be preferable that the restrictive scheduling is only performed on a subset of preambles. To accomplish this, the preambles allocated for exclusive and/or non-exclusive use by LCTEs is less than the entire set of available preambles, in various embodiments of the invention. In this case, restrictive scheduling is only performed for these preambles.

In various embodiments, when LCTE deployments are low, the number of preambles allocated for LCTE usage may be small but as the number of LCTEs increases in the system, the size may be increased to increase PRACH capacity for LCTEs. For example, if there are 60 preambles in Group A, and LCGrpAPreambleSize=6 then the eNB may be configured to only apply RAR restrictive scheduling to preamble 0-5 and all other preambles would use legacy RAR scheduling. Similarly a LC preamble group may be defined for Group B-LCGrpBPreambleSize. In some embodiments, since Group B is used for extended coverage, LC preambles may be defined only for Group B (and not for Group A). However, this approach may unnecessarily use more resources if a LCTE is not in bad coverage.

In view of the above, in various embodiments, one performance criterion to be optimized is that the allocation of preamble sequences for use by LCTEs should tend to be small in order to reduce the occurrence of inefficient, deterministic scheduling. In other words, if the allocation is too large, then the eNB may be unduly scheduling restricted. In contrast, if the allocation is too small, then the allocated preambles may become overused by a potentially large number of LCTEs (in addition to other TEs), which increases the collision rate of PRACH messages in the system.

In various embodiments, if the number of preambles allocated for use by LCTEs is too large for a given network population of LCTEs and non-LCTEs, then preambles may be underutilized. In this case, both coverage and capacity of legacy TEs may be negatively affected. If the number of preambles allocated for use by LCTEs is too small, then as mentioned above the preambles may become overused, leading to increased collision probability. In some embodiments, if the eNB is near capacity and the PDSCH utilization is high, and restricting the scheduling degrades the PDSCH capacity and increases latency, then the eNB may wish to increase the number of preambles allocated for exclusive use by LCTEs and reduce the number of preambles allocated for non-exclusive use by LCTEs. The above and other considerations may be traded off against each other in order to arrive at a preamble allocation that is acceptable or optimal from a system performance point of view.

The following rules represent non-limiting examples of how the preamble allocation may be adjusted in view of system performance criteria. It is noted that such rules may be combined and/or altered in a variety of ways for example in accordance with the above discussion.

If (PDSCH capacity is being degraded by the scheduling restriction of the RARs) and (LCTE shared preambles are underutilized) then the LCTE shared preambles should be reduced.

If (PDSCH capacity is underutilized) and (LCTE shared preambles are over utilized) then LCTE shared preambles should be increased.

If (PDSCH capacity is over utilized) and (LCTE shared preambles are over utilized) then LCTE shared preambles should be reduced and LCTE only preambles should be increased.

If (PDSCH capacity is underutilized) and (LCTE only preambles are over utilized) then LCTE shared preambles should be increased and/or LCTE only preambles should be increased.

It is noted that, in various embodiments, the number of preamble sequences is unchanged from legacy operation. Rather the existing preambles are used in a different way. This may avoid degrading receiver performance of the PRACH that might otherwise occur if new preamble sequences were introduced. However, it is noted that potential scheduling inefficiencies may arise due to the new usage pattern of PRBs and/or preamble sequences. Various embodiments of the present invention relate to operational adjustments in order to mitigate or control such scheduling inefficiencies. In various embodiments, the eNB may adjust the allocation of preamble sequences when plural groups of preamble sequences, indicative of plural different types of LCTE limitations, are present. Each group of preamble sequences may be adjusted with respect to its size and/or its possible overlap with other groups of preamble sequences. Such adjustment may be informed and driven by system performance metrics in a manner similar to that described above, except that a larger number of parameters may be adjustable.

Apparatus and System

Various embodiments of the present invention relate to the operation of LCTEs and base station (eNB) of a version of an LTE network. Embodiments of the present invention can therefore be implemented by modifying the eNB in order to operate as described herein.

In various embodiments, the eNB may be modified in order to transmit additional fields in the SIB2, to detect and respond to certain PRACH preambles in a certain way as described herein, and to collect and process system information and adjust SIB2 fields and/or other behaviours in response, in order to provide for controlled system performance. As such, the eNB of the present invention may be provided by modifying an existing eNB through software or firmware, and possibly by adding additional dedicated processing hardware to carry out the above-mentioned operations. Other functionalities of the eNB are substantially unchanged and would be readily understood by a worker skilled in the art. In some embodiments, the eNB comprises a processor which executes program instructions stored in memory in order to carry out the specific functionalities as described herein.

In various embodiments, the LCTE may be a low-cost MTC TE as described for example in "Study on provision of low-cost MTC TEs based on LTE", TR 36.888, V 2.1.1, and related documents such as RP-130848, "New WI: Low cost & enhanced coverage MTC TE for LTE", Vodafone, 3GPP TSG RAN meeting #60, Oranjestad, Aruba, 10th-14th June, 2013, "Discussion on PUCCH and (e)PDCCH for coverage limited MTC TEs", Huawei, HiSilicon, RAN WG1 Meeting #74, Barcelona, Spain, Aug. 19-23, 2013, R1-132884 and "Analysis and discussion on bandwidth reduction," Huawei, HiSilicon, RAN WG1 Meeting #74, Barcelona, Spain, Aug. 19-23, 2013, R1-132879. In various embodiments, the TE may be configured with reduced buffering and/or reception capabilities for the PDSCH, for example so that it can only buffer a subset of the PDSCH (for example 6 out of 100 PRBs.) The LCTE as described herein is further configured, for example through appropriate hardware, firmware, and/or software, to acquire information (for example by receiving and processing the SIB2) as to which PDSCH preambles are specified for use by LCTEs, and to use only those preambles for transmission on the PRACH. The LCTE may be further configured to predict which PRBs will be used by the eNB to transmit the associated RAR (for example by executing a known function) and to buffer those PRBs. Such operations can be carried out by modification of an existing LCTE, for example through firmware or software modification, as would be readily understood by a worker skilled in the art. In some embodiments, each LCTE comprises a processor which executes program instructions stored in memory in order to carry out the specific functionalities as described herein.

In various embodiments, the LCTE may implement scheduling methodologies for example as related to methodologies discussed in "Analysis and discussion on bandwidth reduction," Huawei, HiSilicon, RAN WG1 Meeting #74, Barcelona, Spain, Aug. 19-23, 2013, R1-132879. A first such methodology includes pre-configuring a pre-defined pattern to indicate the frequency location of reduced bandwidth for an LCTE. The pattern would depend on the TE's ID (IMSI) and change depending on SFN (system frame number). A second such methodology includes semi-statically configuring, via higher layer signaling (e.g. RLC), the frequency location of reduced DL bandwidth, e.g., by RRC dedicated signaling, to an LCTE so as to support more MTC TEs and provide some flexibility. A third such methodology includes dynamically indicating the frequency location via the PDCCH. However, delay between the PDCCH and PDSCH is required. Currently PDCCH and PDSCH are sent in the same sub-frame. A LCTE device would need at least, one sub-frame between PDCCH (DL grant) and PDSCH (data).

In various embodiments, a base station such as an eNB comprises a microprocessor operatively coupled to memory, the memory containing instructions for operating the microprocessor in such a way that the microprocessor directs the base station to execute communication operations in the manner described herein. Similarly, a TE such as an LCTE comprises a microprocessor operatively coupled to memory, the memory containing instructions for operating the microprocessor in such a way that the microprocessor directs the TE to execute communication operations in the manner described herein. The memory may correspond to software or firmware. Other electronics hardware such as logic arrays may be used in place of or to augment such a microprocessor and memory combination in a manner which is equivalent from the perspective of functions being carried out by the hardware.

The invention will now be described with reference to specific examples. It will be understood that the following examples are intended to describe embodiments of the invention and are not intended to limit the invention in any way.

EXAMPLE

The following are model use cases in accordance with particular embodiments of the present invention. For these use cases, it is assumed that the system bandwidth is 10 MHz, and thus the rate of PRACHs/Sec=Pr=200. The number of Legacy TE's is set at 5000, and the number of LCTEs is selected at 50. A small number of LCTEs is realistic during initial phases of deployment. The probability of Sending a PRACH is set at q=0.1% (this will create a fairly loaded system).

Based on ALOHA theory, relevant model equations for the use cases can be defined. The probability of PRACH collisions is modeled by:

$P\text{coll} = (1 - p/\#\text{pre})^{(N-1)}$

The capacity, that is the number of successful PRACH operations per second, is similarly modeled by:

$C = N * q * (1 - q/\#\text{pre})^{(N-1)} * Pr$, where pre is the available number of preambles, q is the TE's probability of sending a PRACH, N is the # of TEs, and Pr=PRACH slots per sec, which is 200 for the 10 MHz system.

Use Case 1: Preambles Split Between LCTEs and Legacy TEs

In this use case, the preambles are split between LCTEs and Legacy TEs in a manner which is not proportional to the number of TE's. The number of contention-free preambles is set to 24, and the number of Group A preambles and Group B preambles is set to 20 each. No preambles are allocated for non-exclusive use by LCTEs, but 8 preambles are allocated for exclusive use by LCTEs.

Use Case 2—Preambles Shared Between LCTEs and Legacy TEs in Non-Ideal Proportions In this use case, all the preambles are shared between LCTE's and Legacy TE's in a manner which is not proportional to the number of TE's. The number of contention-free preambles is set to 24, and the number of Group A preambles and Group B preambles is set to 20 each. No preambles are allocated for non-exclusive use by LCTEs, but 8 preambles are allocated for exclusive use by LCTEs.

Use Case 3: Preambles Split Between LCTEs and Legacy TEs in a "Best-Fit" Proportion In this use case, the preambles are split between LCTEs and Legacy TEs in a manner which is as close as possible proportional to the number of TE's. The number of contention-free preambles is set to 24, and the number of Group A preambles and Group B preambles is set to 27 each. No preambles are allocated for non-exclusive use by LCTEs, but 1 preamble is allocated for exclusive use by LCTEs. The ideal proportion of preambles for such a small number of LCTEs is much less than one so this is the best fit.

Calculations for the three use cases above are given in the following table:

| Use Case | # of UEs (N) | Prob of sending (q) | # of Preambles (#PRE) | Prob of Coll (Pcoll) | #slots/ second (Pr) | Capacity C |
|---|---|---|---|---|---|---|
| Use Case 1 Preambles Shared | 5050 Legacy + CAT 0 UE's | 0.1% | 28 | 16.5001% | 200 | 843.35 |
| Use Case 2 Preambles Split in | 5000 Legacy UE's 50 CAT 0 UE's | 0.1% 0.1% | 20 8 | 22.1165% 0.6107% | 200 200 | 778.83 9.94 |
| uneven proportions | | | | | Total | 788.77 |
| Use Case 3 Preambles Split in | 5000 Legacy UE's 50 CAT 0 UE's | 0.1% 0.1% | 27 1 | 16.9022% 4.7842% | 200 200 | 830.98 9.52 |
| "best fit" proportions | | | | | Total | 840.50 |

The following conclusions can be drawn from the above: Sharing the preambles in ideal proportions appears to have a limited effect on capacity, going from 843 down to only 840. There is a small increase of 0.4% in the probability of a collision for the legacy TEs. The non-ideal proportioning however does raise the Pcoll for legacy TE's to 22% from 16.5%; and it decreases capacity to 788 from 843 successful PRACHs/sec.

Although sharing the preambles appears to have advantages for the PRACH channel, it should be noted that additional capacity may likely be lost due to the inability of the eNB to respond appropriately to LCTEs, because this may result in multiple re-tries by the LCTEs. Despite many re-tries LCTEs may be unable connect to the eNB.

For the second use case—this imbalanced preamble allocation may occur often. Although the allocation of the preambles into the different groups can be set via SIB2, setting this allocation optimally (demand vs. capacity balance) may not always be possible for the following reasons: Measuring the PRACH demand for each group is not trivial and PRACH demand can change quickly; SIB2 can only be changed at low rate so immediate reactions to changes in demand cannot occur; and There is a cost to changing SIB2, namely network resource cost—SIB page indications need to be sent on PDCCH, and TE power consumption is increased—TE's receive the SIB page indication and must re-read all SIBs instead of sleeping.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure some or all of its components in accordance with the system of the invention.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

I claim:

1. A Long Term Evolution (LTE) wireless communication system comprising:
   a) a Limited Capability Terminal Equipment (LCTE) configured, upon initiating a physical random access channel (PRACH) random access operation, to select a PRACH preamble from a predetermined subset of PRACH preambles, said subset of PRACH preambles being strictly contained within and strictly smaller in size than a set of Group A or Group B contention-based PRACH preambles defined for the LTE system, the selected PRACH preamble included in wireless transmission of a PRACH preamble message; and b) an evolved Node B (eNB) configured, in response to receipt of the PRACH preamble belonging to said subset of PRACH preambles, to schedule transmission of an associated random access response (RAR) on a restricted set of physical resource blocks (PRBs) which is predictable and accessible to said LCTE.

2. The system of claim 1, wherein the predetermined subset of PRACH preambles is at least partially used by terminal equipments (TEs) other than the LCTE.

3. The system of claim 1, wherein the eNB is further configured to monitor one or more indicators of system performance and to adjust a size of the predetermined subset of PRACH preambles based on said one or more indicators of system performance.

4. The system of claim 3, wherein one of said one or more indicators of system performance is indicative of usage distribution of the set of all PRACH preambles, and wherein the eNB is configured to adjust the size of the predetermined subset of PRACH preambles to facilitate an increased evenness in said usage distribution.

5. The system of claim 1, wherein the system is configured to cause the restricted set of PRBs to vary over time.

6. The system of claim 1, wherein the restricted set of PRBs is identified by a function commonly known to both the eNB and the LCTE or the eNB is configured to communicate the restricted set of PRBs to the LCTE via a System Information Block (SIB).

7. The system of claim 1, wherein the eNB is further configured to transmit the RAR on the restricted set of PRBs with increased gain relative to Random Access Responses transmitted on PRBs other than the restricted set of PRBs.

8. The system of claim 1, wherein the set of all PRACH preambles available for use correspond to PRACH preambles used by the LTE system, wherein the LCTE is capable of receiving PRBs within a limited bandwidth, and wherein the restricted set of PRBs corresponds to said limited bandwidth.

9. The system of claim 1, wherein a size of the RAR, a Modulation and Coding Scheme corresponding to the RAR and a sub-frame time of the RAR are specified in advance, and wherein scheduling of the RAR on the Physical Downlink Control Channel (PDCCH) is omitted.

10. A method for facilitating random access communication in an LTE network between an eNB and a Limited Capability Terminal Equipment (LCTE), the method comprising:

a) defining a subset of Physical Random Access Channel (PRACH) preambles for use by the LCTE, said subset of PRACH preambles being strictly contained within and strictly smaller in size than a set of Group A or Group B contention-based PRACH preambles available for use;

b) upon initiating a PRACH random access operation by the LCTE, selecting PRACH preambles from said subset of PRACH preambles for inclusion in transmission of a PRACH preamble message to the eNB;

c) in response to receipt of a PRACH preamble belonging to said subset of PRACH preambles by the eNB, scheduling transmission of an associated Random Access Response (RAR) on a restricted set of Physical Resource Blocks (PRBs) which is predictable and accessible to said LCTE.

11. The method of claim 10, wherein the predetermined subset of PRACH preambles is at least partially used by terminal equipments (TEs) other than the LCTE.

12. The method of claim 10, further comprising monitoring, by the eNB, one or more indicators of system performance and to adjust a size of the predetermined subset of PRACH preambles based on said one or more indicators of system performance.

13. The method of claim 12, wherein one of said one or more indicators of system performance is indicative of usage distribution of the set of all PRACH preambles, and wherein adjusting the size of the predetermined subset of PRACH preambles is performed to facilitate an increased evenness in said usage distribution.

14. The method of claim 10, further comprising varying the restricted set of PRBs over time.

15. The method of claim 10, wherein the restricted set of PRBs is identified by a function commonly known to both the eNB and the LCTE or the restricted set of PRBs is communicated from the eNB to the LCTE via a System Information Block (SIB).

16. The method of claim 10, further comprising transmitting the RAR on the restricted set of PRBs with increased gain relative to Random Access Responses transmitted on PRBs other than the restricted set of PRBs.

17. The method of claim 10, wherein a size of the RAR, a Modulation and Coding Scheme corresponding to the RAR and a sub-frame time of the RAR are specified in advance, and wherein scheduling of the RAR on the Physical Downlink Control Channel (PDCCH) is omitted.

18. A set of computer program products for facilitating random access communication in an LTE network between an eNB and an LCTE, the computer program products comprising code stored on non-transitory computer readable media which, when loaded into memory and executed on microprocessors of respective computing devices corresponding to the eNB and the LCTE, is adapted to perform the method of claim 10.

19. An evolved Node B (eNB) servicing a Long Term Evolution (LTE) communication system, the eNB configured to:

a) receive Physical Random Access Channel (PRACH) preamble messages from a plurality of Terminal Equipments (TEs) of the LTE system, said TEs including a Limited Capability Terminal Equipment (LCTE), at least one PRACH preamble from a predetermined subset of PRACH preambles, said subset of PRACH preambles being strictly contained within and strictly smaller in size than a set of Group A or Group B contention-based PRACH preambles defined for the LTE communication system and used by the plurality of TEs, the at least one PRACH preamble included in a corresponding PRACH preamble message; and b) upon receipt of the at least one PRACH preamble belonging to said subset of PRACH preambles, schedule transmission of an associated random access response (RAR) on a restricted set of physical resource blocks (PRBs) which is predictable and accessible to said LCTE, the restricted set of PR % being strictly smaller than a set of all PRBs used in the LTE communication system.

20. A Limited Capability terminal equipment (LCTE) for use in a Long Term Evolution (LTE) communication system, the LCTE configured, upon initiation of a physical random access channel (PRACH) random access operation, to:

a) select a PRACH preamble from a predetermined subset of PRACH preambles, said subset of PRACH preambles being strictly contained within and strictly smaller in size than a set of Group A or Group B contention-based PRACH preambles used in the LTE communication system;
b) wirelessly transmit a PRACH preamble message including the selected PRACH preamble;
c) predict and monitor a restricted set of physical resource blocks (PRBs) for a Random Access Response (RAR) to the PRACH preamble message, the restricted, set of PRBs being strictly smaller than a set of all PRBs used in the LTE communication system, the RAR transmitted by an evolved Node B (eNB), wherein the eNB is configured, upon receipt of the PRACH preamble message containing the PRACH preamble belonging to said subset of PRACH preambles, to transmit the RAR on the restricted set of PRBs.

21. A Long Term Evolution (LTE) system comprising:
a) a Limited Capability Terminal Equipment (LCTE) configured, upon initiating a physical random access channel (PRACH) random access operation, to select a PRACH preamble from a predetermined subset of PRACH preambles, said subset of PRACH preambles being strictly contained within and strictly smaller in size than a set of Group A or Group B contention-based PRACH preambles used in the LTE system, the selected PRACH preamble included in wireless transmission of a PRACH preamble message; and
b) an evolved Node B (eNB) configured, in response to receipt of the PRACH preamble belonging to said subset of PRACH preambles, to adjust one or more operations pertaining to interaction with the LCTE in a manner which accommodates a limitation of the LCTE, said limitation indicated by membership of the PRAM preamble in the subset of PRACH preambles.

22. A method for facilitating communication in an LTE network between an eNB and a Limited Capability Terminal Equipment (LCTE), the method comprising:
a) defining a subset of Physical Random Access Channel (PRACH) preambles for use by the LCTE, said subset of PRACH preambles being strictly contained within and strictly smaller in size than a set of Group A or Group B contention-based PRACH preambles available for use;
upon initiating a PRACH random access operation by the LCTE, selecting PRACH preambles from said subset of PRACH preambles for inclusion in transmission of a PRACH preamble message to the eNB;
b) in response to receipt of a PRACH preamble belonging to said subset of PRACH preambles by the eNB, adjusting one or more operations pertaining to interaction with the LCTE in a manner which accommodates a limitation of the LCTE, said limitation indicated by membership of the PRACH preamble in the subset of PRACH preambles.

23. The eNB according to claim 19, wherein the eNB is further configured to transmit an indication of the predetermined subset of PRACH preambles to the LCTE via a System Information Block (SIB).

24. The LCTE according to claim 20, wherein the LCTE is further configured to receive an indication of the predetermined subset of PRACH preambles to the LCTE via a System Information Block (SIB).

* * * * *